United States Patent
Johnson

(10) Patent No.: US 7,709,993 B2
(45) Date of Patent: May 4, 2010

(54) CONTINUOUS DIRECT CURRENT GENERATOR

(76) Inventor: Daniel Hans Johnson, 20437 Dale Drive, Maple Ridge, British Columbia (CA) V2X 8V5

(*) Notice: Subject to any disclaimer, the term of this patent is extended or adjusted under 35 U.S.C. 154(b) by 131 days.

(21) Appl. No.: 11/990,349

(22) PCT Filed: Aug. 17, 2006

(86) PCT No.: PCT/CA2006/001353
§ 371 (c)(1), (2), (4) Date: Feb. 12, 2008

(87) PCT Pub. No.: WO2007/019700
PCT Pub. Date: Feb. 22, 2007

(65) Prior Publication Data
US 2009/0033171 A1    Feb. 5, 2009

(51) Int. Cl.
*H02K 1/10* (2006.01)
(52) U.S. Cl. .................................................. 310/233
(58) Field of Classification Search ............. 310/233, 310/231
See application file for complete search history.

(56) References Cited

U.S. PATENT DOCUMENTS

| 2,714,174 | A | 7/1955 | Applegage |
| 3,353,041 | A | 11/1967 | Little |
| 3,524,601 | A | 8/1970 | Biddison et al |
| 5,977,684 | A | 11/1999 | Lin |
| 6,952,067 | B2* | 10/2005 | Tanaka et al. ............... 310/248 |
| 2002/0121831 | A1* | 9/2002 | Egawa et al. ................ 310/216 |

FOREIGN PATENT DOCUMENTS

EP    0 385 333    9/1990

* cited by examiner

Primary Examiner—Nguyen H Hanh
(74) Attorney, Agent, or Firm—Deanna J. Shirley

(57) ABSTRACT

A continuous direct current generator comprises a plurality of windings, each being adapted to rotate between two magnetic fields and in unison with a rotator having a plurality of brush contacts. The windings are electrically connected to the brush contacts which deliver current to a split anode-cathode ring within which the rotator rotates. The windings are connected to the brush contacts so as to deliver substantially continuous direct current to the anode-cathode output.

12 Claims, 6 Drawing Sheets

CONTINUOUS DIRECT CURRENT GENERATOR

FIELD OF THE INVENTION

This invention relates generally to power generation devices, and more specifically to a generator that creates continuous direct current from mechanical energy.

BACKGROUND OF THE INVENTION

The search for simpler, more powerful electric generators is an ongoing challenge. The simplest and so far the most efficient method seems to be alternating current generators, which employ methods to convert the flow of alternating current to the direct current which is used in many applications. Overall, however, alternating current generators are very inefficient because, there is "down" time while reversing the current flow. The challenge is to modify the alternating current generator configuration to function as a continuous direct current generator. The windings may be configured to extract power in a unidirectional way. Combining the output of several windings may significantly increase the current into a continuous direct current output, thus eliminating any rectifying required to convert alternating current to direct current.

SUMMARY OF THE INVENTION

The disclosed generator is designed to provide continuous direct current from mechanical energy without the use of rectification or conventional commutation methods. This is achieved by use of a brush rotator turning inside a contact ring which collects power from rotating windings within pairs of magnetic cells to supply direct current to an external circuit.

In one aspect, the invention comprises a direct current generator which has an armature with at least one pair of opposed notches, wire coils wound across each pair of opposed notches, and contacts attached to each end of the coils, where the contacts are able to rotate in unison with the armature.

In a further aspect, the generator also includes a conducting contact ring comprising two halves, with a non-conducting spacer separating each end of the halves, and the contacts rotatable in contact with said contact ring, each half of the contact ring and the contacts being positioned 180 degrees apart maintaining equal but opposite position on each of the halves throughout a 360 degree rotation.

In another aspect, the invention may comprise a generator with a second armature, and a collector electrically connected to each of the armatures, the armatures and collector being rotatable in unison along a common axis, wherein each of the armatures is angularly offset from the other armature about the common axis. The collector may further comprise a rotator and a conducting contact ring comprising two halves separated by non-conducting spacers. One of the halves may be a conductive anode band and the other half may be a conductive cathode band. An anode may be mounted on the anode band and a cathode mounted on the cathode band.

In a further aspect, the invention comprises a generator with contacts which are insertable into lead holes in the collector. Springs or other means may be present in said lead holes to bias the contacts into electrical contact with the contact ring.

In yet another aspect, the invention comprises a direct current generator wherein a first armature is electrically connected to a collector in a direct manner, and a second armature is electrically connected to the collector in a reverse manner.

In yet a further aspect, the invention may comprise a housing for the generator and a central shaft about which the armature and the contact ring are mounted. The housing is preferably an electrically non-conducting material, or may further comprise electrically insulating material between the housing and the armatures, and between the housing and the collector.

These and further aspects of the invention will be appreciated by reference to the detailed description of the preferred embodiment and are defined by the claims that follow.

BRIEF DESCRIPTION OF THE DRAWINGS

The invention will now be described with reference to the following drawings, in which.

DETAILED DESCRIPTION OF THE PREFERRED EMBODIMENTS OF THE INVENTION

Figure 1:
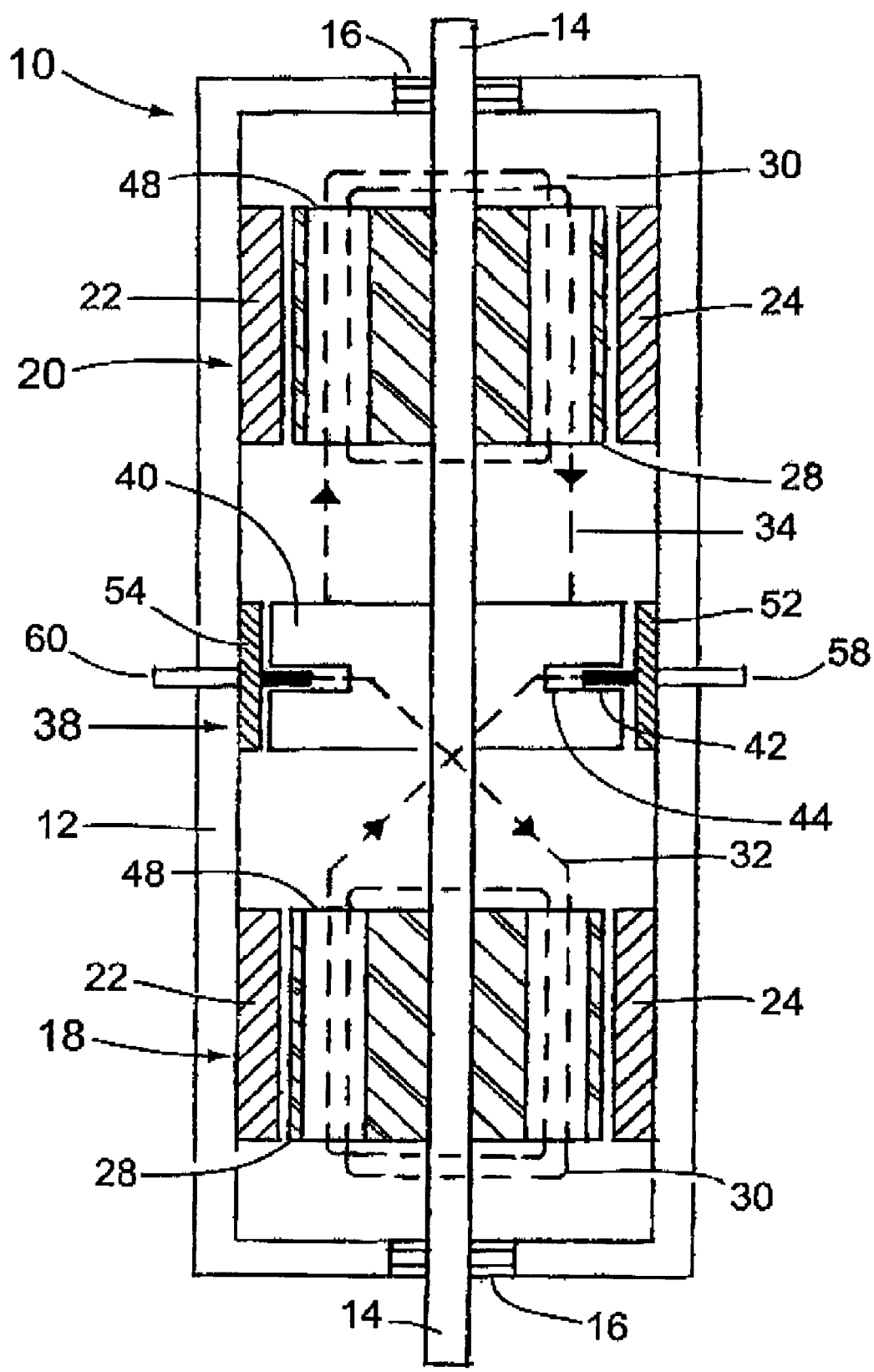
FIG. 1 is a top sectional view of a generator according to an embodiment of the invention, illustrating the main components and representative winding lead connections.

According to the preferred embodiment shown in FIG. 1, a continuous direct current generator 10 is enclosed in a cylindrical housing 12. All rotating parts are mounted on a central shaft 14, which is supported at each end by bearings 16.

Figure 2:
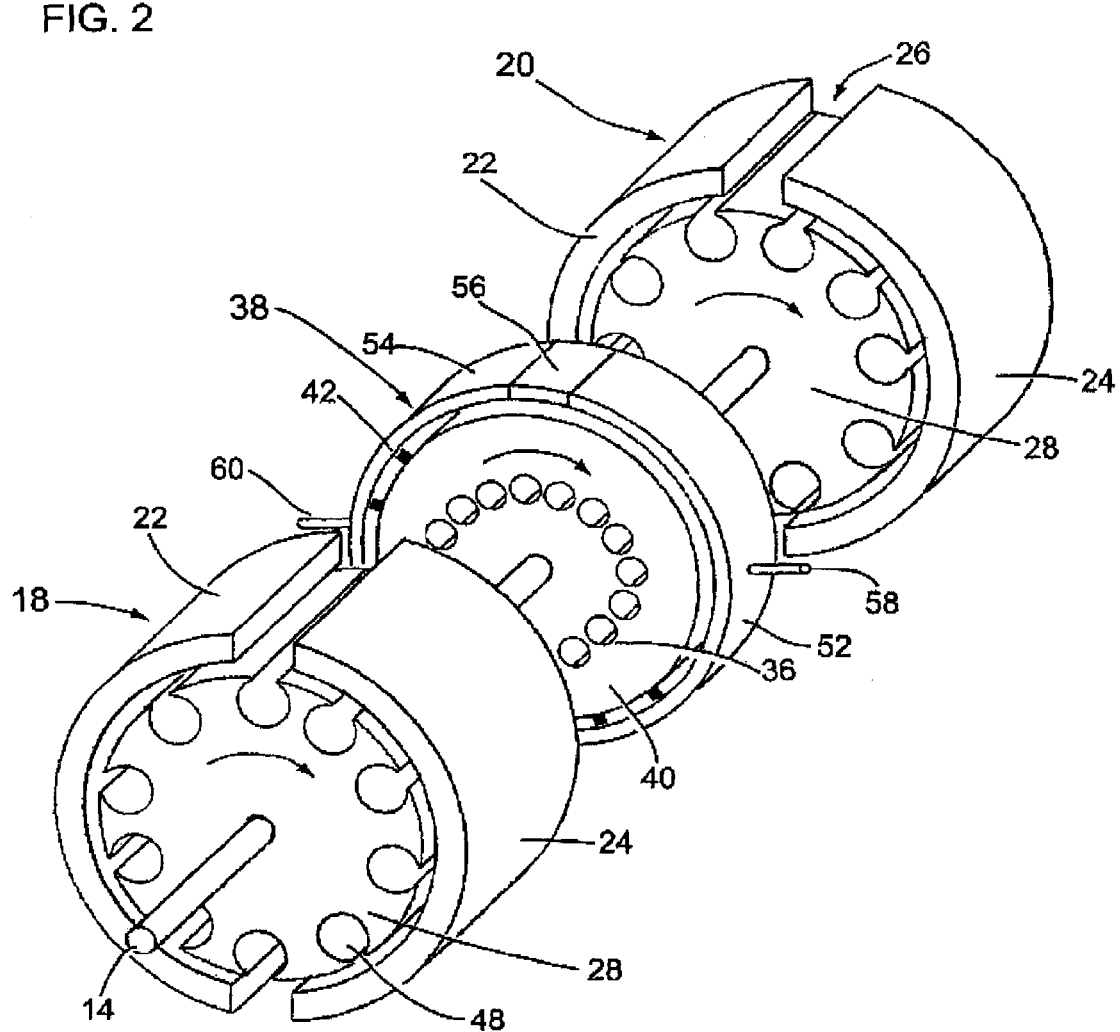
FIG. 2 is a perspective view of a generator according to an embodiment of the invention, showing various internal components without housing or windings.

FIG. 2 illustrates the main functional sub-units of the device, namely a disk-like collector 38 between magnetic cell A 18 and magnetic cell B 20. The collector 38 includes the rotator 40 surrounded by a contact ring 50 (best shown in FIG. 3). Contact ring 50 is mounted inside the midpoint circumference of the housing 12 (not shown). Each magnetic cell includes an armature 28 and its windings 30 (best shown in FIGS. 1 & 4), surrounded by a north magnet 22 and a south magnet 24. Each pair of magnets is mounted inside the end circumference of the housing 12, and is separated by two air gaps 26. The components of each magnetic cell 18, 20 are preferably substantially identical. However, winding 30 leads from each cell are wired differently to the rotator 40, and the angular position of each cell is offset from the other in relation to the shaft 14.

Figure 4:
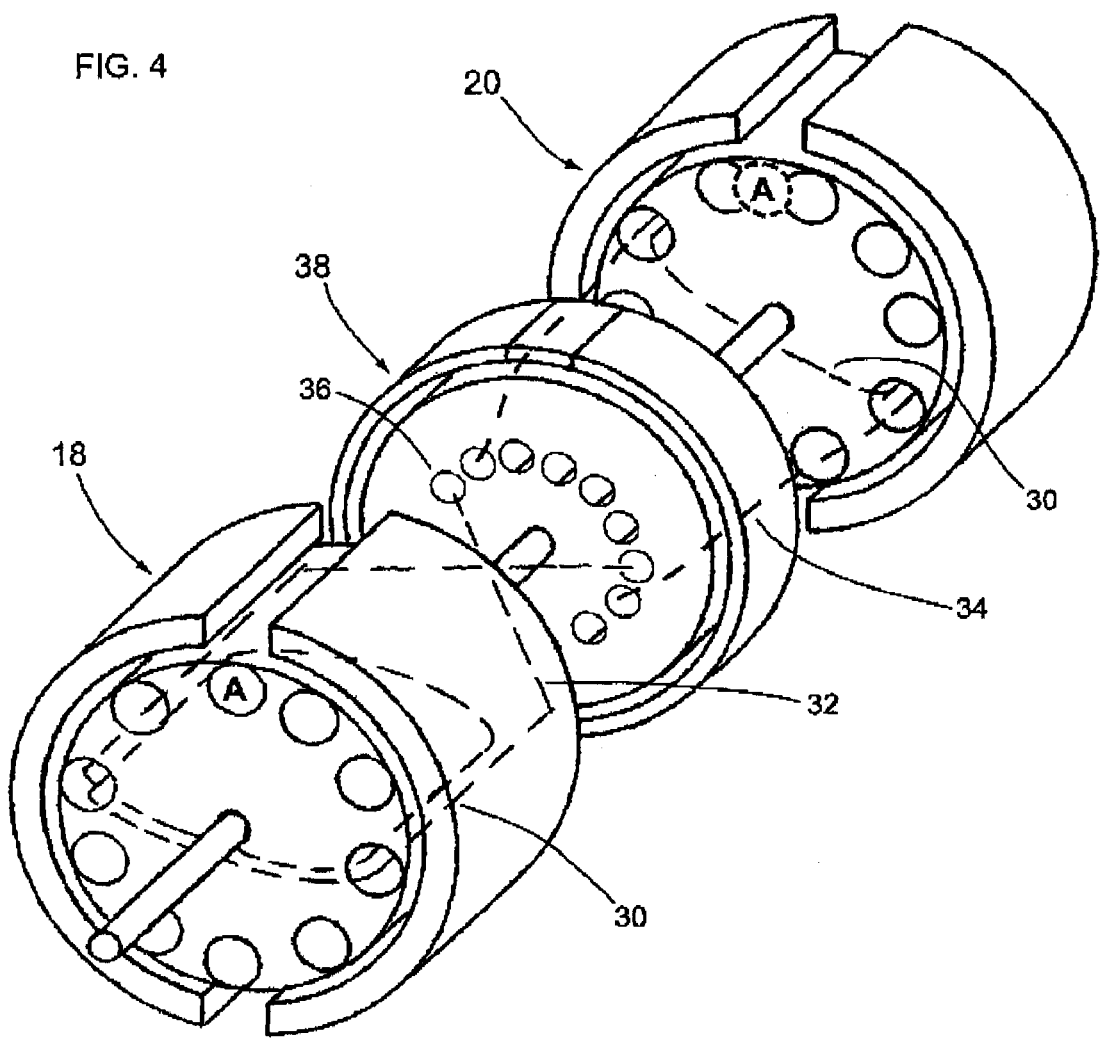
FIG. 4 is a simplified perspective view, of a generator illustrating different winding lead circuits and armature offset configuration.

A lead is defined as any wire from winding 30 that extends outside the notch 48 of the armature 28 in order to connect to a contact, such as a brush 42, on the rotator 40. As shown in FIGS. 1 & 4, magnetic cell A 18 has reverse leads 32, whereas magnetic cell B 20 has direct leads 34 from their respective windings 30. Direct leads 34 go from the notch 48 in the armature 28 of magnetic cell B 20 directly to the closest adjacent brush 42 on the rotator 40. Reverse leads 32 cross over each other after leaving magnetic cell A 18 before connecting to the closest adjacent brush 42 on the rotator 40. Each pair of leads from a winding 30 connects to a pair of brushes 42 on opposing ends of the rotator 40.

The angular position of the armature 28 of magnetic cell A 18 in relation to magnetic cell B 20 is rotated or offset around the shaft 14 by one half of the spacing angle between two adjacent winding notches 48. This is illustrated in FIG. 4 by comparing each armature 28 at the notch marked with an "A". The dashed circle on magnetic cell B 20 denotes the angular offset with respect to magnetic cell A 18.

Figure 3:
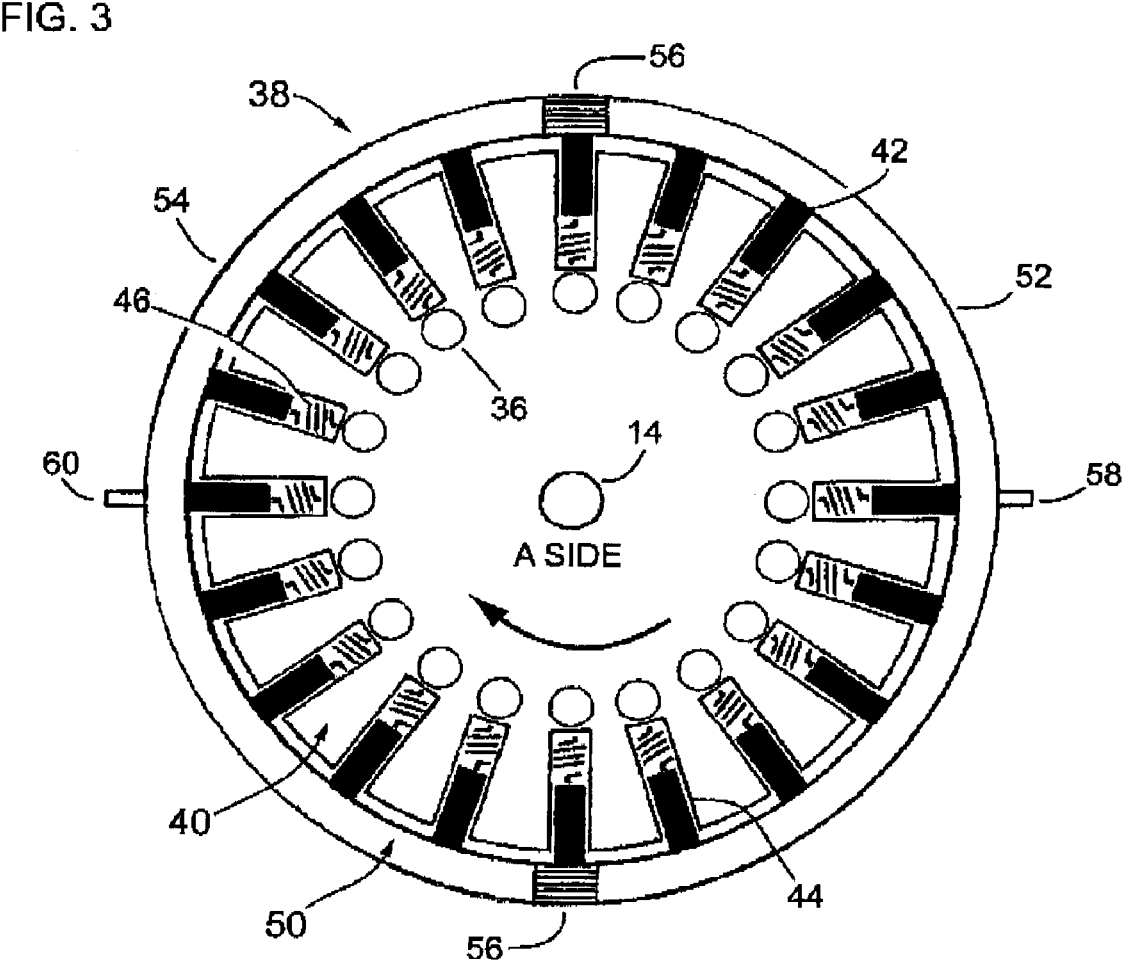
FIG. 3 is a front view (from the magnetic cell A side) of a collector of a generator with a sectional view of a rotator.

As shown in FIG. 3, the collector 38 comprises a rotator 40 turning inside a stationary contact ring 50. Each pair of leads from a winding 30 connects to the rotator 40 across the shaft 14, then into opposing lead holes 36 to connect with brushes 42 in their ports 44. Brushes 42 protruding from each port 44 are forced by the springs 46 into electrical contact with the conducting portions of the inside of the contact ring 50.

The circumference of the contact ring 50 includes a conductive anode band 52, a conductive cathode band 54, and two non-conductive spacers 56. An anode 58 is affixed to the anode band 52, and a cathode 60 to the cathode band 54, both functioning as electrodes for the generator output, and exiting the generator housing 12 at these locations. The collective term used to describe anode and cathode is electrodes.

Figure 5:
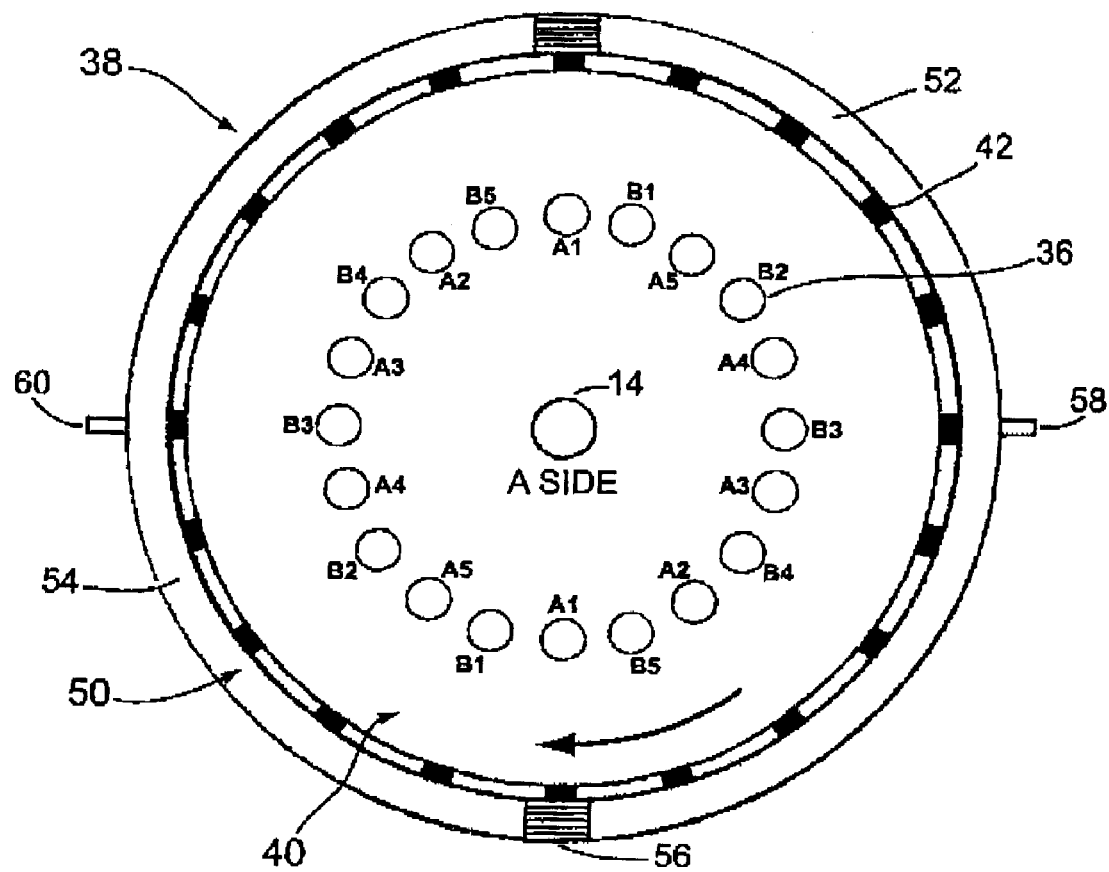
FIG. 5 is a front view (from the magnetic cell A side) of a collector of a generator, illustrating a power generation cycle.

As shown in FIG. 5, each lead hole 36 is labeled A1 to A5 to represent where reversed leads 32 (not shown) enter the rotator 40 from magnetic cell A 18 (not shown). Likewise, each lead hole 36 is labeled B1 to B5 to represent where direct leads 32 enter the rotator 40 from magnetic cell B 20. Each pair of leads from a winding 30 connects to a pair of brushes 42 on opposing ends of the rotator 40.

When the shaft 14 is rotated, electromotive force (EMF) is generated from each winding 30 of each magnetic cell 18, 20, to the leads connected to each brush pair 42, and through the conductive sectors of the contact ring 50. Power from the generator 10 exits from the anode 58, and returns via the cathode 60.

Figure 6:
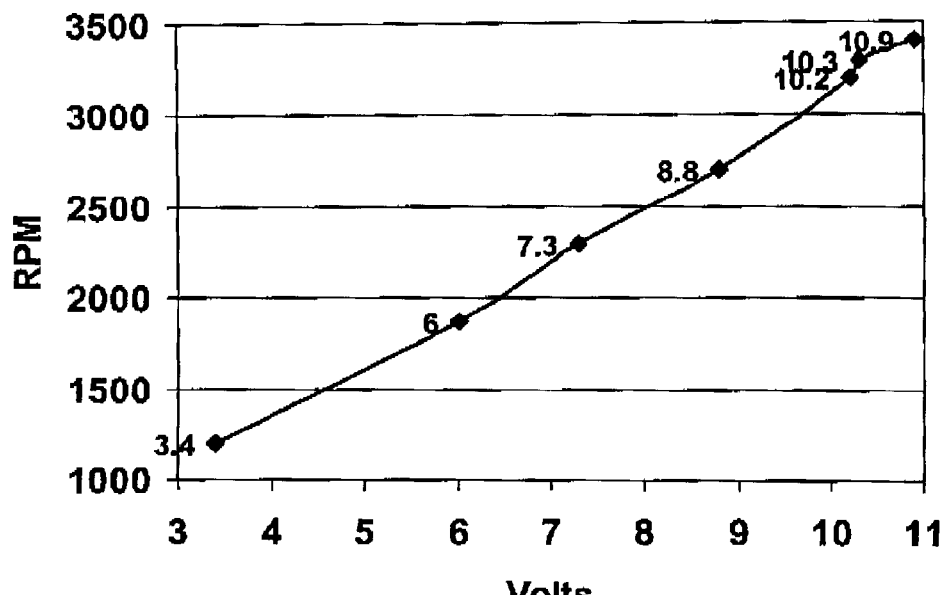
FIG. 6 is a graph of experimental voltage data at selected RPM inputs.
Figure 7:
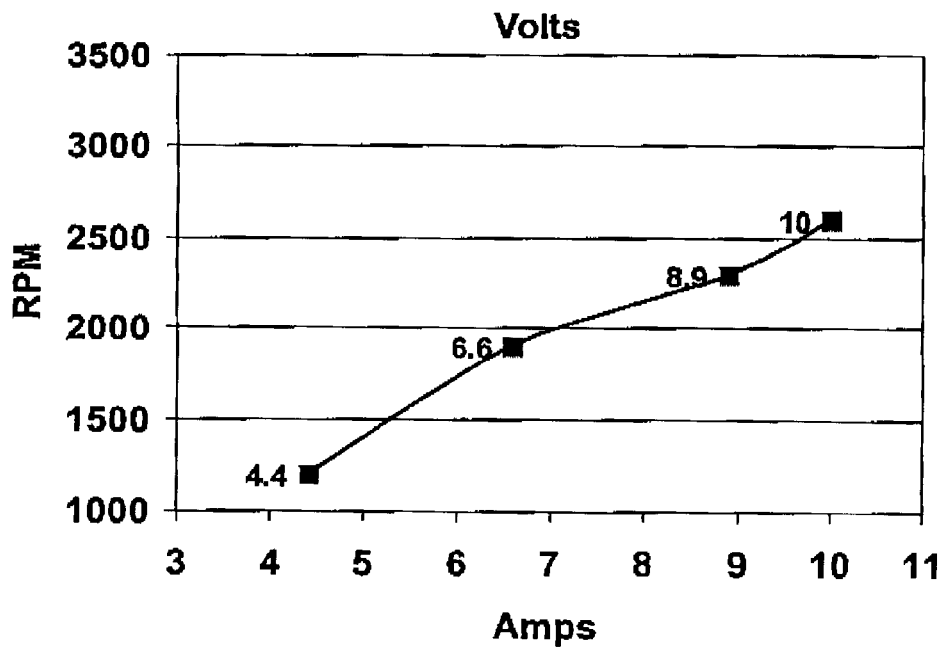
FIG. 7 is a graph of experimental current data at selected RPM inputs.

As shown in FIGS. 6 & 7, the observed output test data at various rotational rates confirms the production of continuous direct current.

The following paragraphs will describe in more detail all functional components of the disclosed generator, and then its method of operation.

As shown in FIG. 1, generator 10 comprises housing 12, which is an enclosure to support the shaft 14 with all its rotating elements, and to support the magnets, rings and electrodes mounted on its inner walls. One generator prototype has been constructed of cylindrical ABS sewer pipe, but any rigid non-conductive low-static material or combination of materials such as plastics, cast aluminum, carbon fiber, or carbon fiber with aluminum reinforcement may be used. Housing 12 may also be formed from conductive material, but this method requires electrical isolation of the housing 12 from the magnets 22, 24, contact ring 50, and electrodes 58, 60 and is therefore somewhat more complicated. However, electrical isolation of internal components may be achieved by the use of a non-conductive sleeve or spacers (not shown) mounted on the inside the housing 12. Isolation of the electrodes 58, 60 from the contact ring 50 to the external circuit requires a non-conductive bushing (not shown) through the metallic housing 12 and a large diameter non-conductive washer (not shown) around each electrode on the outside of the housing 12. The object of isolation is to prevent unwanted conductive paths via the conductive housing enclosure.

Shaft 14 is preferably made of metallic iron due to its strength under rotational stresses, but any equivalently rigid shaft may be used. Shaft 14 may be supported by any suitable method, such as conventional bearing 16 sets built into the center of the ends of the housing body. Equivalent methods of high speed friction reduction support may be used. The shaft 14 may be supported by bearings not anchored in the housing 12, which requires that the bearings 16 and housing 12 be anchored, as housing 12 will rotate in the direction of mechanical input at the shaft 14 without some form of anchor. Metal straps may be used as anchors to affix the housing 12 to a stationary surface. Other anchoring methods may include external anchoring points such as bolt holes or other similar means cast into the enclosure design, or external means of compression such as straps, collars, bars, etc. The object of the anchor is to prevent rotational movement of the housing 12.

Magnetic cells 18, 20 are preferably used in opposing pairs during generator operation. The object of each cell is to provide the EMF output of its set of windings 30 to opposite and alternating pairs of lead holes 36 on one side of the rotator 40 face. The half cylinder shaped magnets 22, 24 may be either permanent or induced, and are preferably mounted around the inside of each cylindrical end of the housing 12. Each air gap 26 between the magnets 22, 24 is center aligned with each neutral block 56 of the contact ring 50. The center of the north magnet 22 aligns with the center of the cathode band 54, and the center of the south magnet 24 aligns with the center of the anode band 52.

Armature 28 is a metal core, which may comprise a series of metal plates stacked together to create a cylindrical core around which windings 30 are wound across opposing notches 48, as best seen in FIG. 1. Armature 28 is mounted on the shaft 14 and, by rotating the windings 30 within the magnets 22, 24 it produces EMF for the collector 38. The armature 28 herein described uses five pairs of notches 48, but any even number of notches may be used that equals half the number of brushes 42 on the rotator 40.

Notches 48 for windings 30 are designed with the object of efficient electrical induction and winding stability under rotational stress. Notches 48 conventionally have openings as shown in FIG. 2, but may be of any appropriate design. Notches 48 may have internal sleeves or similar solution (not shown in drawings) to protect windings 30 from abrasion due to vibration inside notches 48, as well as to prevent shorting due to abrasion on metal corners of armature 28 where windings 30 exit notches 48. The object of effective notch 48 design is to maximize the inductive efficiency of windings 30 and to protect them from abrasion due to rotational stresses.

Windings 30 are preferably single flexible insulated conductors wrapped around an armature 28 and rotated within a magnetic flux field. Windings 30 are illustrated in FIGS. 1 & 4 showing only one turn from each side, in order to also show other components. Conventional generator windings are wrapped or wound between adjacent winding notches. In the magnetic cells 18, 20 of this generator 10 windings 30 are wrapped across winding notches 48 between opposite sides of the armature 28, as shown in FIGS. 2 & 4. This design can increase the magnetic flux output due to the enlarged effective winding area rotating through the magnetic field. Experimentally, eighty turns of 22 gauge diameter windings have been used, and other gauges and number of turns can be used to select the desired power output. Increasing the number of windings 30 used will produce increased amperage and smoother production of power. Liquid rubber or similar product may be used to prevent loosening of windings 30 due to centrifugal vibration where they wrap around the shaft 14, and also serves as a backup insulator should the winding wire become abraded.

As shown in FIGS. 1 & 4, leads 32, 34 are mounted on the end of each brush 42 inside its port 44, by any appropriate means, such as solder. Two alternate configurations are to omit the existing spring 46 and either affix the lead 32, 34 directly to the brush 42, or to coil the ends of each lead 32, 34 before affixing to its brush 42. The spring force of a coiled lead combined with the already significant outward force of the spinning rotator 40 has been observed to have sufficient force to reliably push the brushes into the contact ring. Any method of lead-to-brush configuration that allows the brush 42 to reliably touch the contact ring 50 during high rotational speeds may be used.

Rotator 40 is preferably cylindrical disc that supplies and supports brushes 42 as they rotate inside the contact ring 50. The prototype version is constructed of fiberglass, but any rigid, non-conductive, non-static-storing material such as Bakelite® may be used. Leads 32, 34 from each magnetic cell 18, 20 enter the rotator 40 via the lead holes 36. Lead holes 36 may be cut completely through the face of the rotator 40 to the other side, although this is not strictly necessary. Only alternating lead holes 36 which connect to an appropriate port 44 need to be cut, as only half of the lead holes 36 are supplied from is each magnetic cell 18, 20. Ports 44 are slots sized to fit and hold brushes 42, cut to exit into lead holes 36 from the edge of the rotator 40. Springs 46, if used, are sized to fit inside the port 44 without binding and with enough internal allowance for the lead 32 or 34 to connect to the bottom of the brush 42. Brushes 42 are preferably made of solid graphite, but any material able to efficiently transfer power to the contact ring 50 may be used. In standard generators, the winding ends are attached to stationary contacts on a central shaft which rotates past stationary brushes. In the present system, the ends of each winding 30 attach to each pair of contacts or brushes 42 which are located 180 degrees apart on the rotator disk, which causes all brushes 42 to rotate together. These brushes 42 are rotating inside a contact ring 50 which collects EMF from a pair of opposing magnetic cells 18, 20 and generates continuous direct current to an external circuit. One prototype has five windings 30 in magnetic cell A 18 and five in magnetic cell B 20 feeding EMF to the collector 38. Ten windings 30 require twenty brushes 42 spaced evenly (18 degrees apart) around the circumference of the rotator 40. The current embodiment shows all ports 44 positioned in the same plane of the centerline of the edge of the rotator 40. However, an increased number of winding circuits require an increased number of brushes 42 on the rotator 40, and therefore an increased number of ports 44. To allow more ports 44 to be placed, they may be staggered on either side of the centerline of the edge of the rotator 40. To compensate for this variation, locations of lead holes 36 will be repositioned accordingly.

Contact ring 50 is a conductive split ring which comprises two halves, namely a conductive anode band 52 and a conductive cathode band 54, separated by two non-conductive neutral blocks 56. Contact ring 50 encircles the rotator 40 and is in contact with all brushes 42, except when they pass over the neutral blocks 56. As shown in FIGS. 1 & 2, protruding from the center of the anode band 52 to the outside of the housing 12 is a bolt-like anode 58, and likewise from the center of the cathode band 54 protrudes a cathode 60. Anode band 52 and cathode band 54 are rigid conductive metallic strips encompassing 175 degrees of the circumference of the contact ring 40. Neutral blocks 56 are non-conductive, non-static-storing gap fillers between the anode and cathode bands 52, 54 and preferably encompass approximately 5 degrees of arc. The object of the neutral block 56 is to act as an electrical isolator or gap to prevent arcing between the two conductive bands. The neutral block 56 must have at minimum an angular width larger than that of the brush 42 traveling-across it. Once this angular width is determined, the remaining circumference is split between the anode band 52 and cathode band 54. Angular width of the neutral blocks 56 determine that of the bands 52, 54, and may vary when required. Anodes 58 and cathodes 60 are conductive projections similar to a bolt or a terminal which are mounted on the center of their appropriate band and exit the housing 12 for contact to the external circuit. Anode 58 provides current to external circuit and cathode 60 provides a return path.

In operation, power is generated as the armature 28 with its windings 30, and the rotator 40, turn clockwise with the shaft 14 as viewed from magnetic cell A 18. As winding 30 travels across the air gaps 26 between magnets 22, 24, no EMF is produced. As the winding 30 rotates through the magnetic field, EMF output linearly builds to 100% at midpoint of the magnets 22, 24, then linearly returns to 0% upon returning to the air gaps 26. Maximum EMF is therefore produced twice from each winding during each full rotation. Each winding 30 is producing some EMF during 350 degrees of rotation.

As illustrated in FIG. 5, pairs of lead holes 36 labeled A1-A5 represent the output of windings 30 from magnetic cell A 18. Likewise, pairs of lead holes 36 labeled B1-B5 represent the output of windings 30 from magnetic cell B 20. Each pair of lead holes 36 represents a pair of connected brushes 42, and will be known as such hereafter. As the rotator 40 is turned by the shaft 14, each pair of brushes 42 is provided with the EMF output from their associated winding 30 in alternating sequence from each magnetic cell 18, 20. For example brush pair A1 begins in contact with the neutral blocks 56 at 0% EMF output, and then EMF builds linearly until the brushes 42 rotate to the center of the anode band 52 where the EMF output is 100%. Similarly, as brush pair B5 passes the center of the anode band 52 it also provides its full output at that point. Each brush 42 contacting the anode band 52 supplies power to the external circuit, while the opposite brush 42 provides the return path. All winding 30 circuits are at varying stages of producing EMF simultaneously, excluding the pair in contact with the neutral blocks 56. Output from opposing cells 18 & 20 is balanced when collected by the rotator 40. Alternate windings 30 from both cells 18, 20 reach maximum output in continuous succession. The result is a continuous flow of direct current to the external circuit. In the prototype, with two cells 18, 20 of five windings 30 each, every time a cell 18, 20 rotates one half turn, nine windings 30 are producing power at varying rates with a total output equivalent to five windings 30 at full output of continuous direct current. The anode band 52 collects the EMF output from nine windings 30 simultaneously, whereas the cathode band 54 acts as their return path.

Reversed leads 32 are required because the same EMF output from both cells 18, 20 is bound to the rotational direction of the shaft 14 and but can only exit from the same end of each cell 18, 20. Since the EMF output from each cell 18, 20 must both feed the collector 38 in the middle, magnetic cell A 18 must use reverse leads 32 in order to be in step with the output of the magnetic cell B 20. This follows the well known right hand rule relating field, flow and rotational direction. FIG. 1 shows the direction of EMF flow by arrowheads on each set of leads 32, 34.

Possible variations apparent to those skilled in the art include but are not limited to the number or size of magnetic cell pairs, number of brushes, number of and configuration of winding notches, gauge of winding wire, number of windings, or the layout of brushes on the rotator. Also, alternate materials may be used for the shaft, brushes, bearings, to housing, springs, conductive elements, non-conductive elements, etc., as long as they satisfy the stated objects of each functional element disclosed herein.

The foregoing description of the preferred apparatus and method of installation should be considered as illustrative only, and not limiting. Other techniques or materials may be is employed towards similar ends. Various changes and modifications will occur to those skilled in the art, without departing from the true scope of the invention as defined in the above disclosure, and the following claims.

What is claimed is:

1. A direct current generator comprising:
   an armature comprising at least one pair of opposed notches;
   wire coils wound across each pair of said opposed notches;
   contacts attached to each end of said coils;
   said contacts being able to rotate in unison with said armature;
   a conducting contact ring comprising two halves;
   a non-conducting spacer separating each end of said halves;
   wherein said contacts rotate in contact with said contact ring;
   each half of said contact ring and said contacts being positioned 180 degrees apart maintaining equal but opposite position on each of said halves throughout a 360 degree rotation.

2. The direct current generator of claim 1 further comprising a housing for said generator and a central shaft about which said armature and said contact ring are mounted.

3. A direct current generator comprising:
   an armature comprising at least one pair of opposed notches;
   wire coils wound across each pair of said opposed notches;
   contacts attached to each end of said coils;
   said contacts being able to rotate in unison with said armature;
   a second armature; and
   a collector electrically connected to each of said armatures;
   said armatures and said collector being rotatable in unison along a common axis;
   wherein each of said armatures is angularly offset from the other armature about said axis.

4. The direct current generator of claim 3, wherein said collector comprises:
   a rotator; and
   a conducting contact ring comprising two halves separated by non-conducting spacers.

5. The direct current generator of claim 4, wherein one of said halves comprises a conductive anode band and the other of said halves comprises a conductive cathode band.

6. The direct current generator of claim 5 further comprising an anode mounted on said anode band and a cathode mounted on said cathode band.

7. The direct current generator of claim 3 wherein said contacts are insertable into lead holes in said collector.

8. The direct current generator of claim 7 further comprising springs in said lead holes to bias said contacts into electrical contact with said contact ring.

9. The direct current generator of claim 3 wherein a first one of said armatures is electrically connected to said collector in a direct manner, and a second one of said armatures is electrically connected to said collector in a reverse manner.

10. The direct current generator of claim 3 further comprising a housing for said generator.

11. The direct current generator of claim 10 wherein said housing is an electrically non-conducting material.

12. The direct current generator of claim 11 further comprising electrically insulating material between said housing and said armatures, and between said housing and said collector.

* * * * *